United States Patent [19]

Shaddy

[11] Patent Number: 5,613,720
[45] Date of Patent: Mar. 25, 1997

[54] CUP HOLDER

[76] Inventor: Joseph G. Shaddy, 6601 Stones Throw Rd., Omaha, Nebr. 68152

[21] Appl. No.: 555,578

[22] Filed: Nov. 8, 1995

[51] Int. Cl.$^6$ ........................................ A47J 45/07
[52] U.S. Cl. .................. 294/31.2; 220/738; 220/739
[58] Field of Search ............................ 294/27.1, 31.2, 294/32, 33; 220/738, 739, 753, 758, 903; 16/114 R, 116 R, 116 A; 229/402

[56] References Cited

U.S. PATENT DOCUMENTS

| | | | |
|---|---|---|---|
| 2,029,429 | 2/1936 | Koons | 294/33 |
| 2,137,884 | 11/1938 | Weeks | 294/31.2 |
| 3,088,767 | 5/1963 | Deal | 294/31.2 |
| 3,104,788 | 9/1963 | Wood | 224/45 |
| 3,717,277 | 2/1973 | Stengle, Jr. | 220/758 |
| 3,773,287 | 11/1973 | Hechinger | 294/31.2 |
| 4,158,464 | 6/1979 | Bowen et al. | 294/31.2 |
| 4,552,276 | 11/1985 | Buch | 294/31.2 |
| 4,654,274 | 3/1987 | DeMars | 428/542.4 |
| 4,685,583 | 8/1987 | Noon | 220/94 R |
| 4,715,633 | 12/1987 | Brink et al. | 294/31.2 |
| 4,874,109 | 10/1989 | Cook | 220/94 R |
| 5,147,067 | 9/1992 | Effertz | 220/739 |
| 5,238,161 | 8/1993 | Kimishima | 224/217 |

FOREIGN PATENT DOCUMENTS 751627  7/1956  United Kingdom ................ 294/31.2

Primary Examiner—Dean Kramer
Attorney, Agent, or Firm—Zarley, McKee, Thomte, Voorhees & Sease; Mark D. Frederiksen

[57] ABSTRACT

A cup holder includes a ring of thermally insulative material having an inner surface and an outer surface, with a strip of resilient compressible material affixed to the inner surface circumferentially around the entire extent thereof. A handle is mounted on the outer surface of the ring for supporting the ring and a cup held in the ring. The ring inner surface is generally cylindrical in shape, while the outer surface has an arcuate shape forming a convex shape from the upper to the lower edge of the ring. The handle has a vertically oriented elongated oval-shaped aperture therethrough to receive at least two fingers of a human hand. A projection depends from the lower end of the handle loop adjacent a distal side to form a concave finger grip between the projection and a lower edge of the loop. A pair of depressions are formed in a forward portion of the outer surface of the ring and extend circumferentially, to receive the palmar side of the first and second fingers of the hand. A third depression diametric the first pair of depressions receives the palmar surface of the thumb, so that the ring may be gripped and supported by the hand.

10 Claims, 1 Drawing Sheet

CUP HOLDER

TECHNICAL FIELD

The present invention relates generally to support handles for cups, and more particularly to an improved cup holder which will selectively support a variety of cup sizes, and insulate the hands from temperature extremes on the cup.

BACKGROUND OF THE INVENTION

Disposable cups, utilized for coffee, tea, and other beverages, are typically formed from paper, cellular plastic foam, or other plastic materials. In most cases, such disposable cups have smooth sides and are not equipped with handles.

The main problem with paper or noncellular plastic materials for disposable cups, is the poor insulation characteristics of such materials. For this reason, hot beverages, such as coffee or tea, can be hot to the touch and prevent a consumer from conveniently holding the cup. Even cups having good insulation characteristics, such as insulating foam cups, can become hot, or wet to the touch, and difficult to handle.

A second problem associated with disposable cups is the difficulty of handling such cups when no handles are present. Examples of U.S. patents granted on inventions providing handles to cups and cans include U.S. Pat. No. 4,685,583 to Noon, U.S. Pat. No. 5,147,067 to Effertz, U.S. Pat. No. 4,874,109 to Cook and U.S. Pat. No. 4,715,633 to Brink et al.

A problem associated with prior art attachable cup handles is the requirement that the cup or beverage container be of a single size for a particular handle. Beverage containers of various sizes therefore require various sizes of cup handles.

SUMMARY OF THE INVENTION

It is therefore a general object of the present invention to provide an improved cup handle for disposable cups.

Another object of the present invention is to provide an improved cup handle which insulates the fingers from the cup carried in the handle.

A further object is to provide an improved cup handle which is selectively attachable to a wide variety of cup sizes.

Still another object of the present invention is to provide an improved cup handle which is economical to manufacture and refined in appearance.

These and other objects will be apparent to those skilled in the art.

The cup holder of the present invention includes a ring of thermally insulative material having an inner surface and an outer surface, with a strip of resilient compressible material affixed to the inner surface circumferentially around the entire extent thereof. A handle is mounted on the outer surface of the ring for supporting the ring and a cup held in the ring. The ring inner surface is generally cylindrical in shape, while the outer surface has an arcuate shape forming a convex shape from the upper to the lower edge of the ring. The handle has a vertically oriented elongated oval-shaped aperture therethrough to receive at least two fingers of a human hand. A projection depends from the lower end of the handle loop adjacent a distal side to form a concave finger grip between the projection and a lower edge of the loop. A pair of depressions are formed in a forward portion of the outer surface of the ring and extend circumferentially, to receive the palmar side of the first and second fingers of the hand. A third depression diametric the first pair of depressions receives the palmar surface of the thumb, so that the ring may be gripped and supported by the hand.

DESCRIPTION OF THE PREFERRED EMBODIMENT

Figure 1:
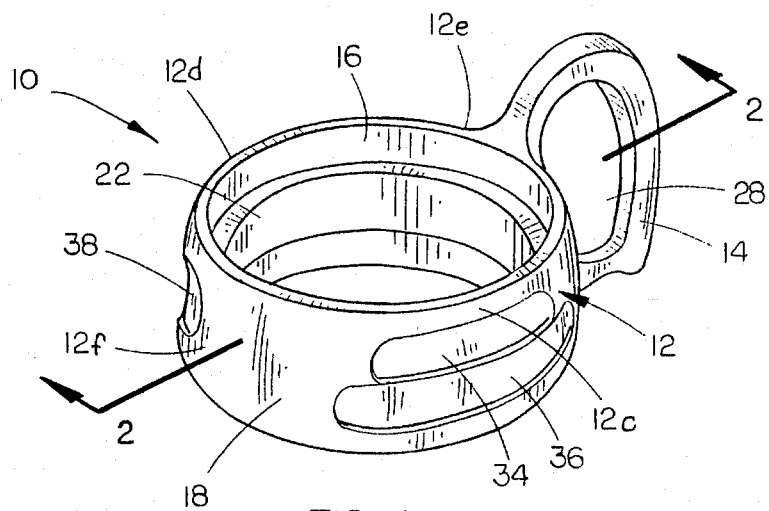
FIG. 1 is a perspective view of the cup holder of the present invention.

Referring now to the drawings, in which similar or corresponding parts are identified with the same reference numeral and more particularly to FIG. 1, the cup holder of the present invention is designated generally at 10 and includes a rigid ring 12 of thermally insulative material such as plastic. Ring 12 includes an inner generally cylindrical surface 16, and an outer arcuate surface 18. A handle 14 is affixed to outer surface 18 for supporting ring 12.

Figure 2:
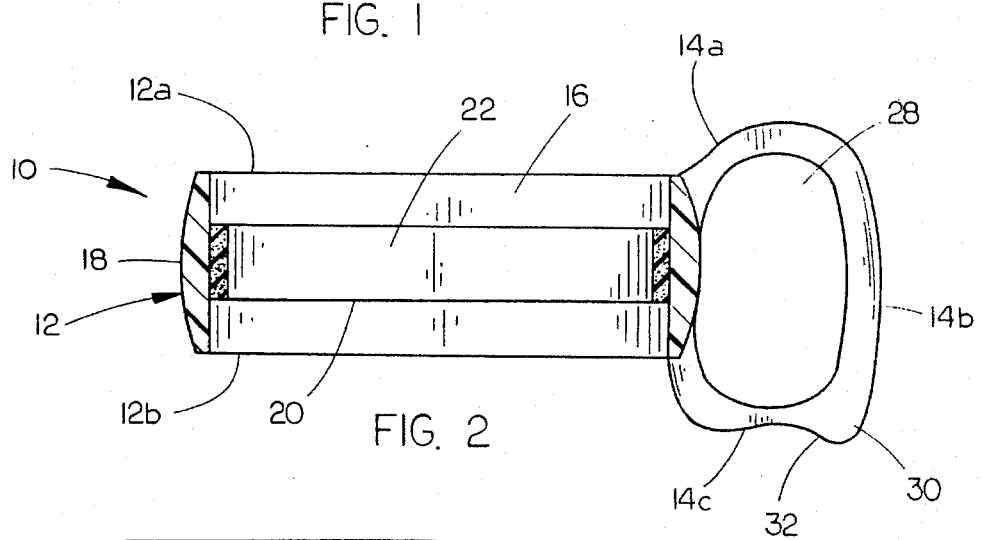
FIG. 2 is a vertical sectional view through the cup holder.

As shown in FIG. 2, ring 12 has upper and lower edges 12a and 12b respectively with outer surface 18 forming a convex surface from the upper to lower edge. Inner surface 16 has a strip 20 of compressible material, such as foam, mounted intermediate the upper and lower edges 12a and 12b. Strip 20 has an inward face 22 concentric with ring inner face 16 which will frictionally grip a disposable cup. Two different size cups 24 and 26 are shown in holder 10 in FIGS. 3 and 4, demonstrating the versatility of cup holder 10 to hold and support cups of various sizes.

Handle 14 is preferably formed of a rigid thermal insulative material formed in a vertically oriented loop. A vertically extending elongated oval-shaped aperture 28 within the loop of handle 14 provides sufficient room for at least two fingers.

Handle 14 includes a proximal edge 14a, affixed to ring 12, and a distal edge 14b spaced apart from ring 12. A lower edge 14c of handle 14 includes a depending projection 30 adjacent distal edge 14b, forming a concave finger grip 32 between projection 30 and lower edge 14c. In this way, a third finger assists in supporting handle 14 and cup holder 10.

Figure 3:
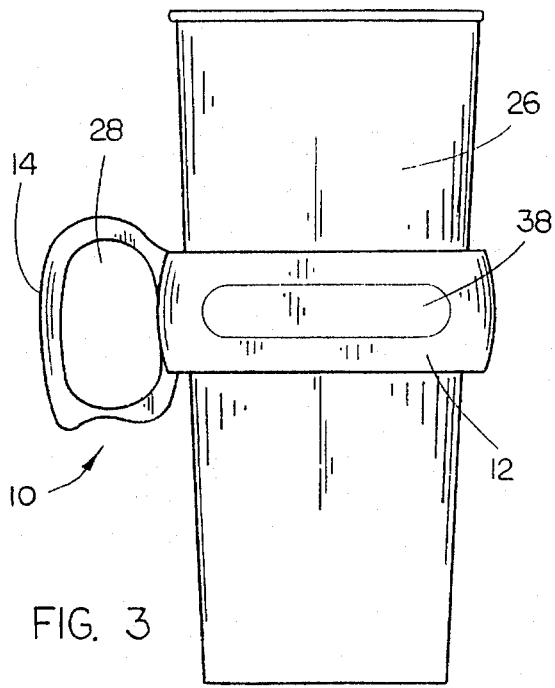
FIG. 3 is a rear elevational view of the holder with a large cup therein.
Figure 4:
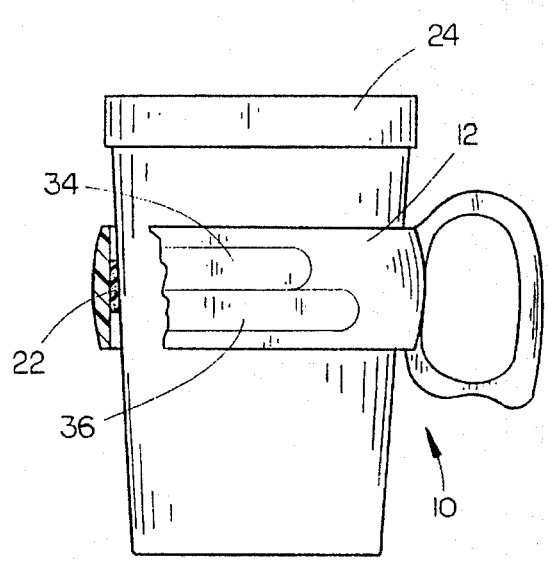
FIG. 4 is a front elevational view with a small cup therein.

Referring once again to FIGS. 1 and 4, outer surface 18 of ring 12 includes a forward portion 12c diametric a rearward portion 12b, a first end portion 12e and a diametric second end portion 12f, end portions located intermediate the forward and rearward portions. A pair of parallel elongated depressions 34 and 36 are formed circumferentially in outer surface 18 of ring forward portion 12c, and shaped to receive the palmar face of the index in middle finger of a hand. Preferably, depression 36, located below depression 34, is longer than depression 34 so as to receive the middle finger. A third depression 38 is formed diametric to depressions 34 and 36, and centered between the upper and lower edges of ring 12, as shown in FIGS. 1 and 3. Third depression 38 will receive the palmar surface of the thumb of the consumer's hand to permit gripping of ring 12 independently of handle 14.

Whereas the invention has been shown and described in connection with the preferred embodiment thereof, many modifications, substitutions and additions may be made which are within the intended broad scope of the appended claims.

I claim:

1. A cup holder, comprising:

a ring of thermally insulative material, having an inner surface, an outer surface, and upper and lower edges between the inner and outer surfaces; and a strip of resilient, compressible material affixed to the inner surface of said ring and extending circumferentially around the entire extent thereof, for frictionally engaging a cup inserted through said ring;

said ring outer surface including a forward portion, a rearward portion, and opposing first and second end portions, and further comprising a pair of elongated depressions formed in the outer surface forward portion extending parallel to one another and parallel to the ring upper and lower edges.

2. The cup holder of claim 1, further comprising a handle mounted on the outer surface of said ring, for supporting said ring with a cup herein.

3. The cup holder of claim 2, wherein said handle includes a vertically oriented loop with an aperture therethrough.

4. The cup holder of claim 3, wherein said handle loop includes a proximal side mounted to the ring outer surface, a distal side diametric the proximal side, and a lower edge connecting the proximal and distal sides, and further comprising a projection depending from the handle lower edge adjacent the distal side forming a concave finger grip between the projection and the loop lower edge.

5. The cup holder of claim 2, wherein said handle aperture has a vertically oriented elongated-oval shape to receive at least two fingers of a human hand therethough.

6. The cup holder of claim 1, wherein said ring inner surface is generally cylindrical in shape.

7. The cup holder of claim 6, wherein said ring outer surface is arcuate, to form a convex shape from upper to lower edge.

8. The cup holder of claim 1, wherein said ring outer surface is arcuate, to form a convex shape from upper to lower edge.

9. The cup holder of claim 1, wherein said pair of depressions includes an upper depression and a lower depression, and wherein the lower depression has a length greater than that of the upper depression.

10. The cup holder of claim 1, further comprising a third depression located diametric to the pair of depressions and extending generally parallel thereto.

* * * * *